US012613406B2

(12) United States Patent
Gray

(10) Patent No.: US 12,613,406 B2
(45) Date of Patent: Apr. 28, 2026

(54) LAPTOP MAGNIFIER

(71) Applicant: Terry Gray, Albuquerque, NM (US)

(72) Inventor: Terry Gray, Albuquerque, NM (US)

( * ) Notice: Subject to any disclaimer, the term of this patent is extended or adjusted under 35 U.S.C. 154(b) by 231 days.

(21) Appl. No.: 18/200,038

(22) Filed: May 22, 2023

(65) Prior Publication Data

US 2024/0393577 A1     Nov. 28, 2024

(51) Int. Cl.
*G02B 25/00* (2006.01)
(52) U.S. Cl.
CPC .................................. *G02B 25/005* (2013.01)
(58) Field of Classification Search
CPC .................................................... G02B 25/005
USPC ........................................................ 359/802
See application file for complete search history.

(56) References Cited

U.S. PATENT DOCUMENTS 6,574,051 B1 * 6/2003 Powell ................. G02B 25/002
359/809

* cited by examiner

*Primary Examiner* — William Choi
(74) *Attorney, Agent, or Firm* — Lyman Moulton, Esq.; Moulton Patent, PLLC

(57) ABSTRACT

A magnifier is the only product of its kind that offers a completely hands-free scope option that requires little to no adjustment after set-up. This unprecedented product is uniquely designed with high-grade magnifying lenses that cover large viewing areas, possesses durable LED lights to deliver operational excellence and glass strength ranging from 2 to 3× magnification to help with clarity for the viewer during utilization.

15 Claims, 3 Drawing Sheets

LAPTOP MAGNIFIER

BACKGROUND

Reading fine or small prints is known to cause a strain on the eyes, and for those who have problems reading smaller writing, which can quickly cause frustration. Although magnifiers do exist, many of them will require individuals to constantly re-adjust, move, and hold the magnifier, or prop the reading material up; all of which can be incredibly inconvenient to manage long-term.

An apparatus to simply and effectively aid individuals who have trouble reading small writing, is not being met by any known device or system at present. There have been no products available as original equipment or as an aftermarket to address this problem either.

SUMMARY OF THE INVENTION

The main purpose of is to provide users with a hands-free magnifier that can be used in portrait or landscape mode for books or magazines and is adjustable for the viewer similar to a laptop.

Figure 1:
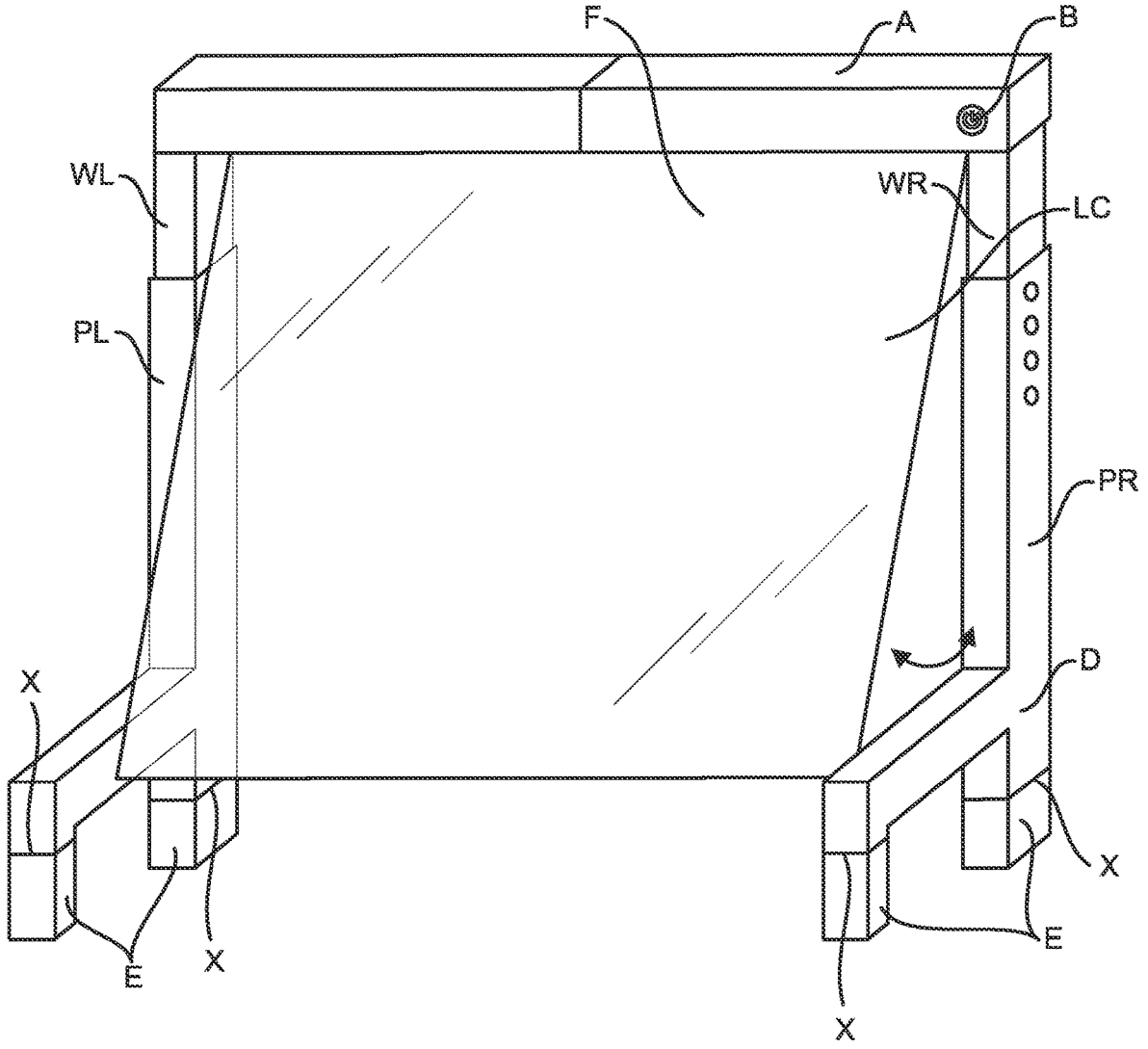
FIG. 1 is a front perspective view of the tilted magnifier, in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'compound magnifying lens' refers to multiple and stacked flat and rectangular fresnel like lenses consisting of concentric rings of segmental lenses having a short focal length,' used throughout. The disclosed magnifying lenses contain annular steps to reduce the focal length and reduce a thickness of the lens to predetermined parameters by controlling the step size granularity. Therefore, a hinge or a fold of the edges of the compound magnifying lenses enables the user to increase the focal field by folding out the multiple lens to a single or reduced number of lenses and to increase the focal length by folding in the multiple lens one on top of another to fewer lenses and even a single compound lens. The 'folds' act therefore like hinges between separate lens to enable compound magnification or a single magnification over a larger focal area.

FIG. 1 is a front perspective view of the tilted magnifier showing: expandable header referenced as A, light power/control button referenced as B, a flat and rectangular and compound magnifying lens (0-180 degrees) referenced as LC, expandable legs referenced as E, and illuminating light referenced as F, in accordance with an embodiment of the present disclosure. A right web WR telescopes from the right post PR and a left web WL telescopes from the left post PL. The expanded compound magnifying lens LC hangs straight down or at a tilted angle as depicted from the header A. Dimensions are such that the disclosure can be put over a user's lap and embodiments in front of a book. The front and the back legs also have an extension option X to lengthen and shorten respective legs independently or together according to a surface the legs rest upon.

Figure 2:
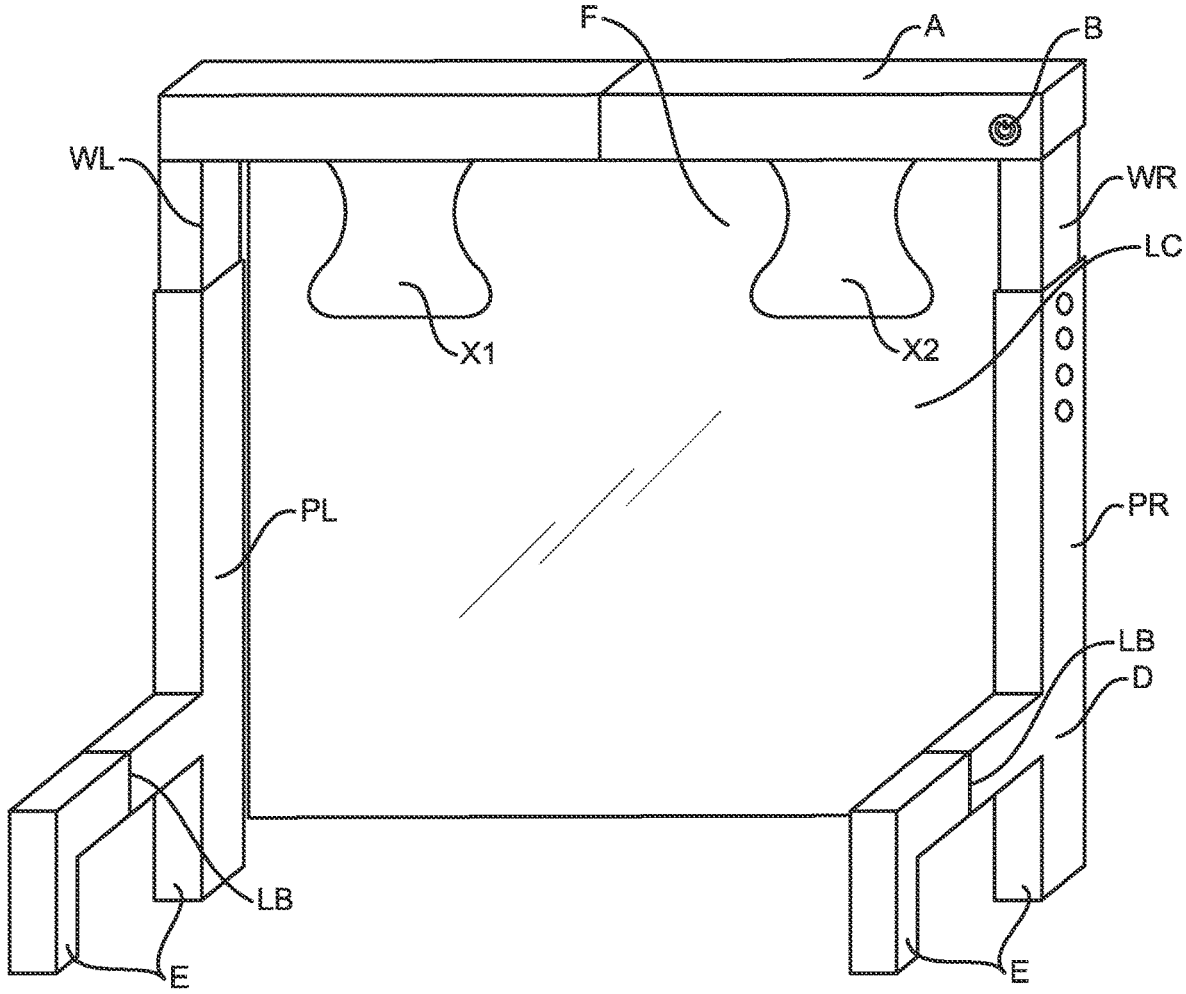
FIG. 2 is a front perspective view of the straight magnifier, in accordance with an embodiment of the present disclosure.

FIG. 2 is a front perspective view of a straight magnifier showing: expandable or telescoping header referenced as A, light power/control button referenced as B, a flat and rectangular fresnel like compound magnifying lens (0-180 degrees) referenced as LC, expandable or telescoping legs referenced as E, illuminating light referenced as F, right post PR, left post PL, right telescoping web WR, left telescoping web as WL and the brace expansion LB in each set of legs in accordance with an embodiment of the present disclosure. Brackets X1 and X2 hold a book or an object directly behind the compound lens LC in order to enable a focus of the compound lens and the book or object.

Figure 3:
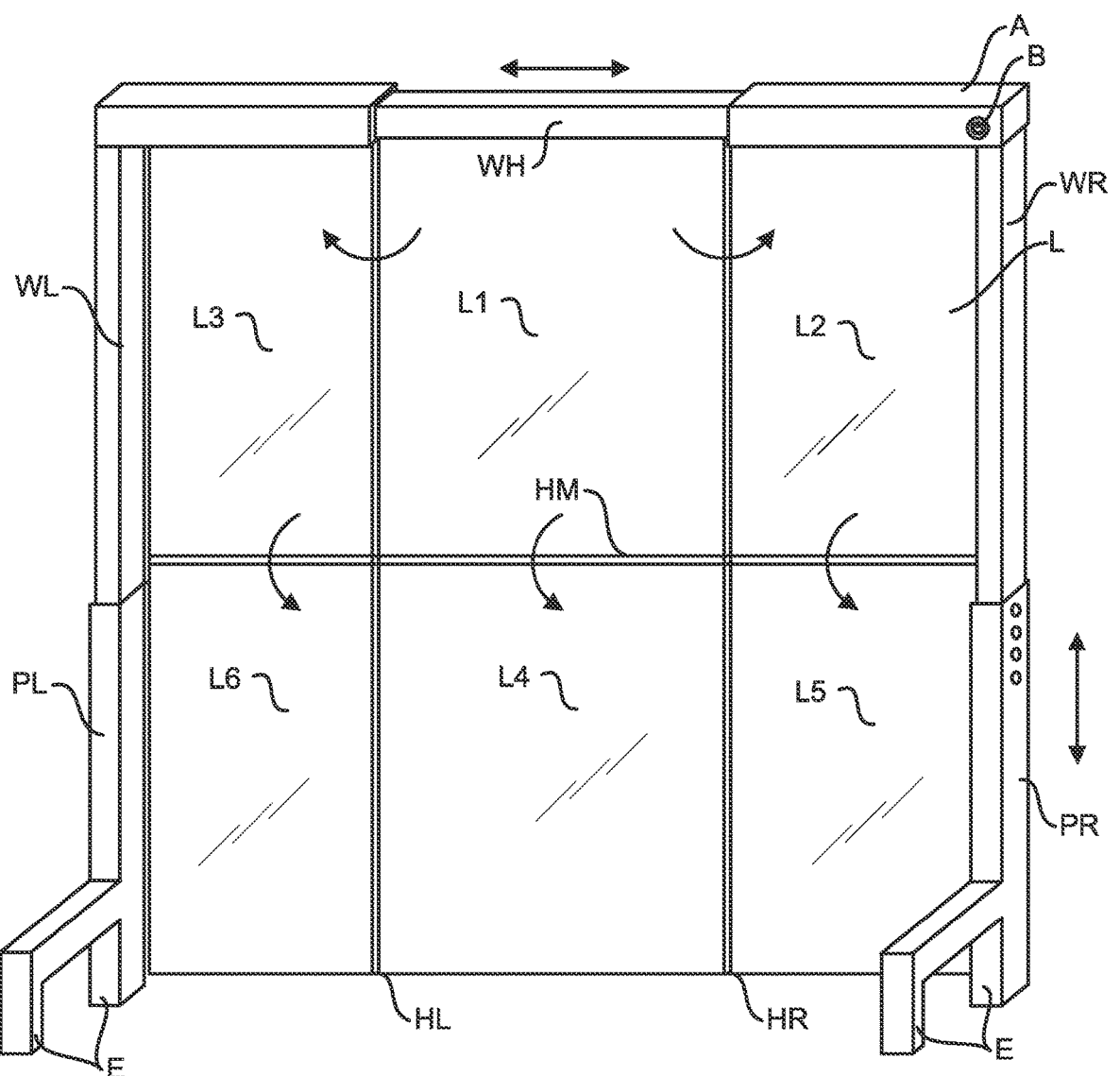
FIG. 3 is a front perspective view of the expanded magnifier, in accordance with an embodiment of the present disclosure.

FIG. 3 is a front perspective view of an expanded magnifier showing: expandable top referenced as A, light power/control button referenced as B, expandable and telescoping legs referenced as E, folding (expandable) and therefore compound magnifying lens similar to a fresnel lens and referenced as LC, right hinge HR, left hinge HL, middle hinge HM and the header web WH, left web WL and right web WR are displayed in accordance with an embodiment of the present disclosure. The hinges enable unfolding or separating the six lens L1, L2, L3, L4, L5 and L6 in order to telescope the disclosure and still have magnification on a book or an object there behind. The hinges are therefore simply folds in a plastic material comprising the flat lenses folded on top of each other to increase visual aberations and therefore a magnifying effect for the user.

Ingenious and practical, a magnifier offers a modern scope alternative option that makes reading fine print more accessible, simple, and requires no re-adjusting to allow for an improved reading experience, at all times. Expanding on the initial design of an average magnifier, A Magnifier introduces a novel magnifier that can be adjusted from landscape, portrait, and/or an open book. The glass strength will consist of up to three magnification settings while the glass holder can also be adjusted to help with the clarity for the viewer. To further enhance functionality, the tray that holds the reading material can be tilted, similar to a laptop to provide the best viewing angle. After set-up, a magnifier permits users to move the tray according to their personal preference. Moreover, a magnifier is strategically equipped with LED lighting placed under the glass to ensure readers are able to clearly see and read all text with ease. As a result, this innovative-top quality product may benefit all individuals who seek to have a more convenient and simple means of reading fine print text.

Additional embodiments include adjustable rear legs with fixed front legs, and folding legs to enable folding up like a laptop computer. The base is also weighted to be able to hold books without tipping over. Text labels and indicia include and the eyes of them that see shall not be dim. The frame is made of plastic or wood and composites.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A magnifier comprising:
a frame comprising a left post and a right post and a header adjoined there between, wherein the left post, the right post and the header are telescoping;
a set of four legs comprising a set of two legs on the left post and a set of two legs on the right post;
a magnifying lens configured to suspend from the header.

2. The magnifier of claim 1, further comprising a light disposed on an underside of the header and adjacent the magnifying lens.

3. The magnifier of claim 1, wherein the magnifying lens is swivable on a hanger suspended from the header.

4. The magnifier of claim 1, wherein the magnifying lens is square and planar.

5. The magnifier of claim 1, wherein the magnifying lens is a compound lens comprising separable two layers of magnifying lenses.

6. The magnifier of claim 5, wherein the two layers are separable via a common fold there between.

7. The magnifier of claim 1, wherein the left post and the right post telescope and lock into a predetermined common height.

8. The magnifier of claim 1, wherein the header further comprises a left side and a right side configured to slide on a web section internal to the left side and to the right side and to expand a total length thereof.

9. The magnifier of claim 1, wherein a brace between each of the two legs on the left post and the two legs on the right post are telescoping.

10. The magnifier of claim 1, wherein the magnifying lens is a compound lens comprising three separable layers of magnifying lens.

11. The magnifier of claim 10, wherein the three layers are separable via a common fold on a right edge of a first lens and on a left edge of the first lens.

12. The magnifier of claim 11, wherein the three layers are separable via a common fold on a bottom edge of a first lens.

13. The magnifier of claim 1, wherein the magnifying lens is a compound lens comprising six separable layers of magnifying lens.

14. The magnifier of claim 13, wherein three of the six separable layers are separable via a common fold on a right edge of the first lens to create a second lens and on a left edge of the first lens to create a third lens.

15. The magnifier of claim 14, wherein three more of the six separable layers are separable via a common fold on a bottom edge of the first lens, a bottom edge of the second lens and a bottom edge of the third lens.

* * * * *